US008096032B1

(12) United States Patent
Bender et al.

(10) Patent No.: US 8,096,032 B1

(45) Date of Patent: Jan. 17, 2012

(54) TOGGLING PUNCH

(75) Inventors: Ralph A. Bender, Stayton, OR (US); Alan F. Bender, Turner, OR (US)

(73) Assignee: Valmont Industries, Inc., Valley, NE (US)

( * ) Notice: Subject to any disclaimer, the term of this patent is extended or adjusted under 35 U.S.C. 154(b) by 1314 days.

(21) Appl. No.: 11/786,707

(22) Filed: Apr. 12, 2007

(51) Int. Cl.
*B23P 11/00* (2006.01)

(52) U.S. Cl. ......... 29/243.518; 29/444; 29/512; 29/521; 29/522.1; 29/890.038

(58) Field of Classification Search ............. 29/890.038, 29/444, 509, 512, 521, 522.1, 523, 243.5, 29/243.517, 243.518
See application file for complete search history.

(56) References Cited

U.S. PATENT DOCUMENTS

| | | | | | |
|---|---|---|---|---|---|
| 2,110,039 | A | * | 3/1938 | Double | 411/183 |
| 2,178,187 | A | * | 10/1939 | Sake | 72/325 |
| 2,626,581 | A | * | 1/1953 | Almgren et al. | 413/27 |
| 3,345,730 | A | * | 10/1967 | Laverty | 29/243.518 |
| 3,361,251 | A | * | 1/1968 | Olsson | 206/713 |
| 3,453,831 | A | * | 7/1969 | Rusche | 405/249 |
| 3,555,831 | A | * | 1/1971 | Pogonowski | 405/227 |
| 3,875,649 | A | * | 4/1975 | King, Jr. | 29/418 |
| 4,090,709 | A | * | 5/1978 | Fujii | 473/566 |
| 4,212,099 | A | * | 7/1980 | Williams et al. | 29/507 |
| 4,333,672 | A | * | 6/1982 | Arthur et al. | 285/382.2 |
| 4,334,703 | A | * | 6/1982 | Arthur et al. | 285/222 |
| 4,393,564 | A | * | 7/1983 | Martin | 29/890.031 |
| 4,557,029 | A | * | 12/1985 | Stewart | 29/253 |
| 4,574,448 | A | * | 3/1986 | Brandenstein et al. | 29/283.5 |
| 4,711,012 | A | * | 12/1987 | Wolters | 29/243.518 |
| 4,835,825 | A | * | 6/1989 | Warner | 29/33 K |
| 4,893,390 | A | * | 1/1990 | Hoeffken | 29/890.03 |
| 4,934,038 | A | * | 6/1990 | Caudill | 29/523 |
| 5,129,253 | A | * | 7/1992 | Austin et al. | 72/370.07 |
| 5,433,100 | A | * | 7/1995 | Easterbrook et al. | 72/391.2 |
| 5,596,881 | A | * | 1/1997 | Wilson et al. | 62/503 |

* cited by examiner

*Primary Examiner* — David Bryant
*Assistant Examiner* — Christopher Koehler
(74) *Attorney, Agent, or Firm* — Advent IP, P.C., L.L.O.

(57) ABSTRACT

A toggling punch for attaching a waveguide entry spinning to a waveguide entry panel wherein the cylindrical body portion of the waveguide entry spinning is deformed outwardly over the waveguide entry panel by means of a plurality of inclined movable pins which are moved to their crimping positions by means of a hydraulic cylinder operatively connected thereto.

1 Claim, 5 Drawing Sheets

TOGGLING PUNCH

BACKGROUND OF THE INVENTION

1. Field of the Invention

This invention relates to a toggling punch and more particularly to a toggling punch for attaching one or more waveguide spinnings to a waveguide entry panel. This invention also relates to a method of attaching a waveguide entry spinning to a waveguide entry panel.

2. Description of the Related Art

Waveguides or cables normally extend from an antenna structure into an enclosure or building with the waveguides passing through waveguide entry panels either positioned on the side of an equipment building or enclosure or on the roof of the equipment building or enclosure. Normally, the waveguide entry panels include one or more spinnings which are riveted to a panel with the panel then being installed over an opening formed in either the wall or the roof of the equipment building or enclosure. The process of riveting the spinnings to the panel is time-consuming and requires the alignment of the rivet openings in the flange of the spinning with the rivet openings in the panel so that rivets may be inserted therethrough.

SUMMARY OF THE INVENTION

A toggling punch is described for attaching a waveguide entry spinning, including an elongated tubular body portion having a flange extending transversely from one end thereof, to a waveguide entry panel having a circular opening formed therein which receives the tubular body portion extending upwardly therethrough so that the flange of the spinning is positioned at the lower side of the entry panel. The punch of this invention includes a vertically disposed hydraulic cylinder having a cylinder body with a base end and a cylinder rod extending upwardly from the cylinder body and being movable between extended and retracted positions. The base end of the cylinder is fixed to a first support. A crimping assembly is positioned on and is secured to a second support which is positioned above the first support.

The crimping assembly comprises a base plate which is secured to the second support and a cylindrical crimping body having upper and lower ends with a central opening extending vertically therethrough. The crimping body also has a plurality of radially spaced-apart inclined bores formed therein which have upper and lower ends with the lower ends of the bores exiting from the crimping body adjacent the lower end thereof. The crimping assembly also includes a plurality of radially spaced-apart inclined crimping pins, having upper and lower ends, movably mounted in the bores of the crimping body so as to extend downwardly and outwardly from their upper ends to their lower ends. Each of the crimping pins is movable between an upper non-crimping position to a lower crimping position with each of the crimping pins being spring-loaded to yieldably urge the crimping pins to their upper non-crimping positions. The lower ends of the crimping pins protrude from the lower ends of the bores when the crimping pins are in their crimping positions.

A crimping pin actuator is vertically movably mounted on the crimping body and is adapted to move the crimping pins to their lower crimping positions. The crimping pin actuator is operatively connected to the cylinder rod of the hydraulic cylinder for movement therewith.

The base plate is larger than the diameter of the cylindrical crimping body so as to provide a supporting surface for the spinning flange and the entry panel thereon whereby the crimping pins, when moved to their crimping positions, will outwardly deform the tubular body portion of the waveguide entry spinning above the waveguide entry panel to attach the waveguide entry spinning to the waveguide entry panel.

It is therefore a principal object of the invention to provide a toggling punch for more efficiently and economically attaching the flange of a waveguide spinning to a waveguide entry panel.

A further object of the invention is to provide a device of the type described which more efficiently and economically permits the attachment of waveguide spinnings to waveguide entry panels.

Yet another object of the invention is to provide a toggling punch of the type described which eliminates the need for riveting waveguide entry spinnings to waveguide entry panels.

These and other objects will be apparent to those skilled in the art.

DESCRIPTION OF THE PREFERRED EMBODIMENT

Figure 5:
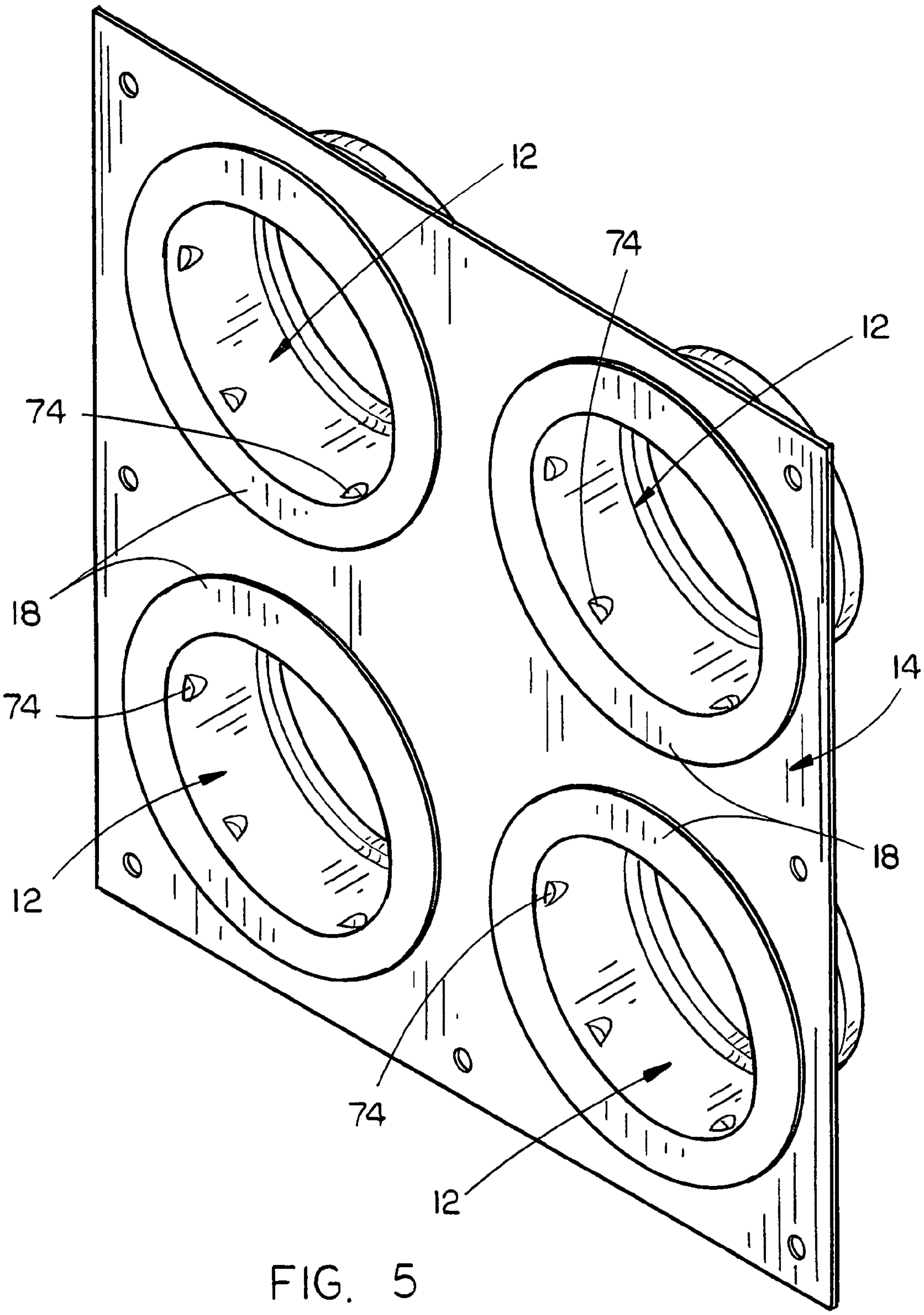
FIG. 5 is a perspective view illustrating a plurality of waveguide entry spinnings having been attached to a waveguide entry panel through the use of the toggling punch of this invention.

The numeral 10 refers generally to the toggling punch apparatus or assembly of this invention which is designed to attach a waveguide spinning 12 to a waveguide entry panel 14. Spinning 12 includes a cylindrical or tubular body portion 16 having a flange 18 extending outwardly therefrom at one end thereof. Panel 14 has a circular opening 20 formed therein which is adapted to receive the tubular body portion 16 extending upwardly therethrough so that the flange 18 is positioned adjacent the underside of panel 14. The toggling punch 10 is adapted to secure the spinning 12 to the panel 14 without the use of rivets or the like as will be explained in detail hereinafter. Any number of spinnings 12 may be attached to a waveguide entry panel. For example, FIG. 5 illustrates four spinnings 12 attached to a panel having four openings or ports formed therein.

In the drawings, the numeral 22 refers to a first support or supporting surface which is positioned below a second support or supporting surface 24. A vertically disposed hydraulic cylinder 26 has its base end 28 secured to a plate 30 which is secured to support 22 by any convenient means such as bolts, screws, etc. Hydraulic cylinder 26 may be replaced by an air cylinder, air actuator, etc. Cylinder 26 has a cylinder rod 32 movably extending from the upper end thereof which is selectively movable between extended and retracted positions. A cylindrical member 34 is secured to the cylinder rod 32 for movement therewith and has a stop ring or disc 36 secured thereto by welding or the like.

Figure 1:
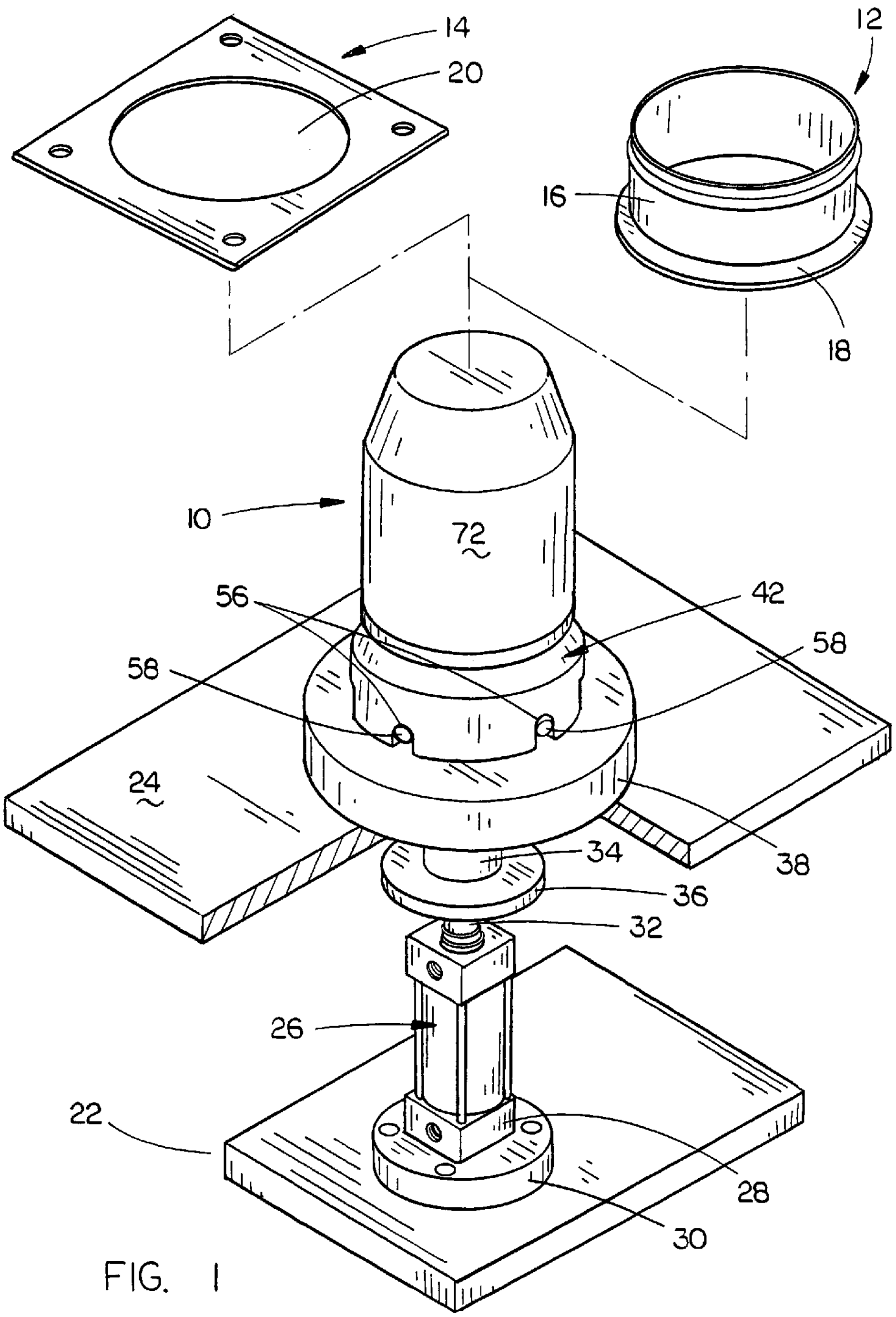
FIG. 1 is a perspective view of the toggling punch of this invention together with associated supports and a waveguide spinning and waveguide panel.
Figure 2:
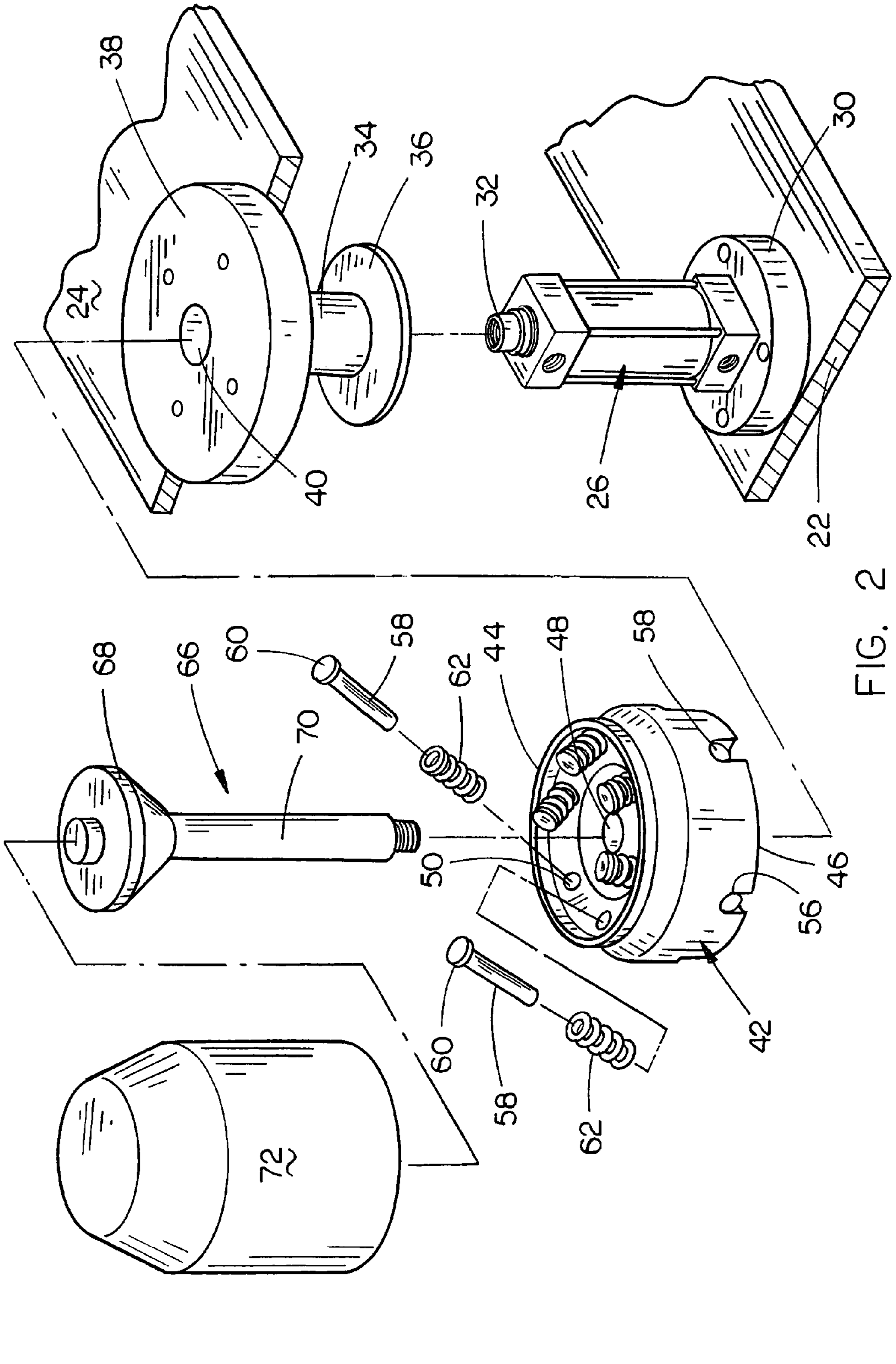
FIG. 2 is an exploded perspective view of the toggling punch of this invention.
Figure 3:
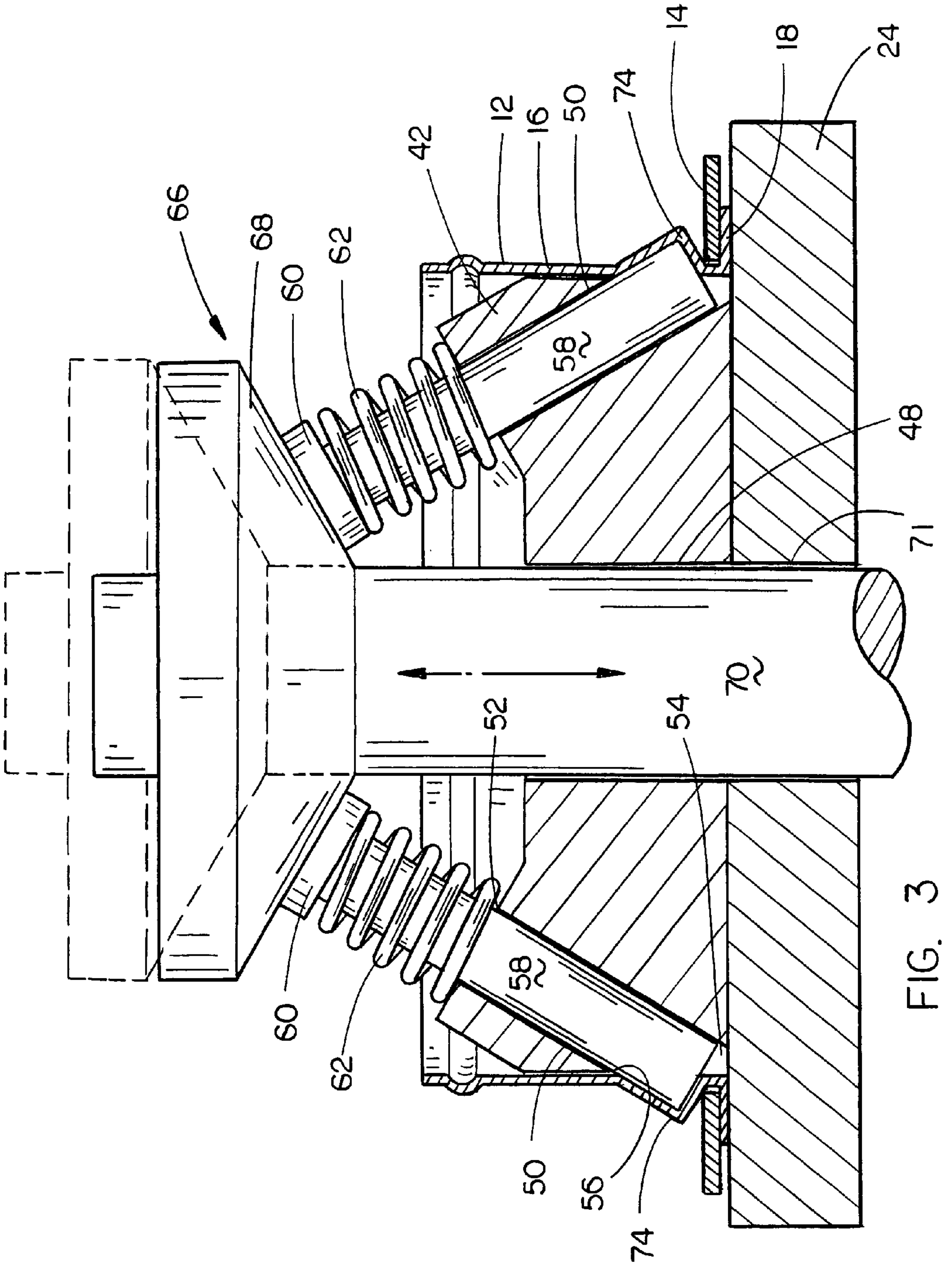
FIG. 3 is a partial sectional view of the toggling punch of this invention.
Figure 4:
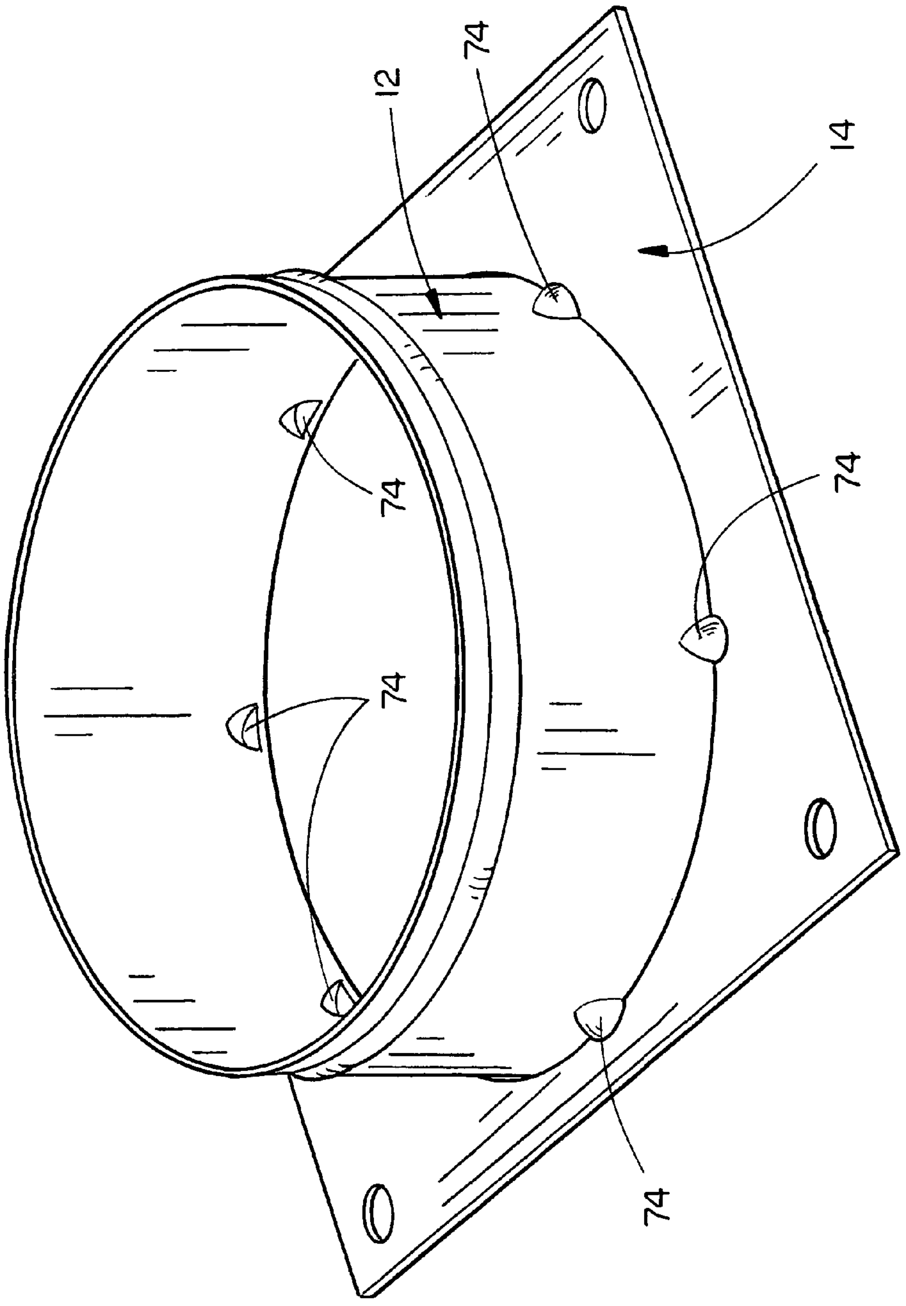
FIG. 4 is a perspective view of a single waveguide entry spinning attached to a waveguide entry panel utilizing the toggling punch of this invention.

The numeral 38 refers to a plate or disc which is secured to the support 24 by any convenient means such as by bolts, screws, etc. Plate 38 has a central opening 40 formed therein which communicates with the interior of cylindrical member 34. Punch 10 includes a cylindrical crimping body 42 having an upper end 44 and a lower end 46. Crimping body 42 is provided with a central bore or opening 48 extending vertically therethrough. Crimping body 42 has a plurality of radially spaced-apart inclined bores 50, each of which has an upper end 52 and a lower end 54. As seen in FIG. 2, the lower ends of bores 50 define a U-shaped opening 56 at the lower outer end of crimping body 42. An elongated crimping pin 58 is movably positioned in each of the inclined bores 50 and has an enlarged head 60 provided thereon. A spring 62 embraces each of the pins 58 between head 60 and crimping body 42 to normally urge the pin 58 towards its upper non-crimping position of FIGS. 1 and 2. When the pins 58 are in their upper non-crimping position, the lower ends 64 thereof do not protrude through the openings 56. When the pins 58 are in their lower crimping position, as seen in FIG. 3, the lower ends 64 thereof protrude outwardly through the openings 56.

The numeral 66 refers to a crimping pin actuator which is movably mounted in crimping body 42 for operating the crimping pins 58. Actuator 66 includes a conical-shaped head portion 68 having a shaft 70 extending downwardly therefrom. Shaft 70 movably extends downwardly through opening or bore 48 and through opening 71 in support 24 and has its lower end secured to the upper end of cylindrical member 34 by any convenient means such as threads or the like. Cover 72 is preferably snap-fitted onto crimping body 42 to enclose the upper ends of the actuator 66 and pins 58 during use.

In operation, the hydraulic cylinder 26 is normally in its extended position so that the conical-shaped head portion 68 is spaced above the heads 60 of pins 58. When it is desired to attach a spinning 12 to a panel 14, the spinning 12 is inserted over the cover 72 and crimping body 42 so that the flange 18 of the spinning 12 rests upon the upper surface of plate 38 outwardly of cover 72 and crimping body 42. Panel 14 is then positioned on top of the flange 18 (FIG. 3). The cylinder rod 32 of hydraulic cylinder 26 is then retracted which causes actuator 66 to be moved downwardly with respect to crimping body 42 which causes the conical-shaped head portion 68 to engage the upper ends of pins 58 and to drive the same downwardly through the bores 52 so that the lower ends of pins 58 pass through the openings 56 and deform the spinning 12, as seen in FIG. 3, so that the shoulders 74 are moved outwardly over the panel 14 which attaches the spinning 12 to the panel 14.

It can be appreciated that the toggling punch of this invention permits the attachment of spinnings to a waveguide entry panel in a much more rapid manner than if rivets were used. The punch of this invention eliminates the need for rivets as well as the tedious task of aligning rivet openings in the spinning flange and panel.

Thus it can be seen that the invention accomplishes at least all of its stated objectives.

We claim:

1. A toggling punch for attaching a waveguide entry spinning, including an elongated tubular body portion having a flange extending transversely from one end thereof, to a waveguide entry panel having an upper side, a lower side and a circular opening formed therein which is adapted to receive the tubular body portion extending upwardly therethrough so that the flange of the spinning is positioned at the lower side of the entry panel, comprising:

a vertically disposed hydraulic cylinder having a cylinder body with a base end and a cylinder rod extending upwardly from said cylinder body and being movable between extended and retracted positions;

said base end of said cylinder being fixed to a first support;

a crimping assembly positioned on and secured to a second support which is positioned above said first support;

said crimping assembly comprising:

(a) a base plate secured to said second support;

(b) a cylindrical crimping body having upper and lower ends with a central opening extending vertically therethrough, said crimping body also having a plurality of radially spaced-apart inclined bores formed therein which have upper and lower ends with the lower ends of said bores exiting from said crimping body adjacent the lower end thereof;

(c) a plurality of radially spaced-apart inclined crimping pins, having upper and lower ends, movably mounted in said bores in said crimping body so as to extend downwardly and outwardly from their said upper ends to their said lower ends;

(d) each of said crimping pins being movable between an upper non-crimping position to a lower crimping position, each of said crimping pins being spring-loaded to yieldably urge said crimping pins to their upper non-crimping positions, said lower ends of said crimping pins protruding from the lower ends of said bores when said crimping pins are in their crimping positions;

(e) a crimping pin actuator vertically movably mounted on said crimping body which is adapted to move said crimping pins to their said lower crimping positions;

(f) said crimping pin actuator being operatively connected to said cylinder rod of said hydraulic cylinder for movement therewith;

said base plate being larger than the diameter of said cylindrical crimping body so as to provide a supporting surface for the spinning flange and the entry panel thereon whereby said crimping pins, when moved to their said crimping positions, will outwardly deform said tubular body portion of the waveguide entry spinning above said waveguide entry panel to attach the waveguide entry spinning to the waveguide entry panel.

* * * * *